(12) United States Patent
Song

(10) Patent No.: US 11,448,748 B2
(45) Date of Patent: Sep. 20, 2022

(54) SYSTEMS AND METHODS FOR SIMULTANEOUS RANGE-RATE UNWRAPPING AND OUTLIER REMOVAL FOR RADAR

(71) Applicant: Argo AI, LLC, Pittsburgh, PA (US)

(72) Inventor: Xiufeng Song, San Jose, CA (US)

(73) Assignee: Argo AI, LLC, Pittsburgh, PA (US)

( * ) Notice: Subject to any disclaimer, the term of this patent is extended or adjusted under 35 U.S.C. 154(b) by 135 days.

(21) Appl. No.: 17/016,558

(22) Filed: Sep. 10, 2020

(65) Prior Publication Data

US 2022/0075052 A1 Mar. 10, 2022

(51) Int. Cl.
G01S 13/70 (2006.01)
G05D 1/02 (2020.01)
G06T 7/70 (2017.01)
G06K 9/62 (2022.01)

(52) U.S. Cl.
CPC ............ *G01S 13/70* (2013.01); *G05D 1/0212* (2013.01); *G06K 9/6284* (2013.01); *G06T 7/70* (2017.01); *G06T 2207/10028* (2013.01); *G06T 2207/30252* (2013.01)

(58) Field of Classification Search
CPC .... G01S 13/70; G05D 1/0212; G06K 9/6284; G06T 7/70; G06T 2207/10028; G06T 2207/30252; G06V 20/58; G06V 20/64
USPC ......................................................... 342/95
See application file for complete search history.

(56) References Cited

U.S. PATENT DOCUMENTS

| 5,247,303 | A | 9/1993 | Cornelius et al. |
| 2007/0164897 | A1* | 7/2007 | Leskiw ................. G01S 13/726 342/195 |
| 2013/0242284 | A1 | 9/2013 | Zeng |
| 2014/0072220 | A1 | 3/2014 | Goodman et al. |

(Continued)

FOREIGN PATENT DOCUMENTS

| WO | 2022012158 A1 | 1/2022 | |
| WO | WO2022012158 | * 1/2022 | ............... G06K 9/00 |

OTHER PUBLICATIONS

Xu, et al., "A VAD-Based Dealiasing Method for Radar Velocity Data Quality Control," Journal of Atmospheric and Oceanic Technology, vol. 28, Jan. 2011, pp. 50-62.

(Continued)

*Primary Examiner* — Jerome Grant, II
(74) *Attorney, Agent, or Firm* — Fox Rothschild LLP

(57) ABSTRACT

Systems and methods for operating radar systems. The methods comprise, by a processor: receiving point cloud information generated by radar devices; grouping data points of the point cloud to form at least one segment; computing possible true range-rate values for each data point in the at least one segment; identifying a scan window including possible true range-rate values for a largest number of data points; determining whether at least two modulus of the data points associated with the possible true range-rate values included in the identified scan window have moduli values that are different by a certain amount; determining a new range-rate value for each data point of the segment, when a determination is made that at least two modulus of the data points do have moduli values that are different by the certain amount; and modifying the point cloud information in accordance with the new range-rate value.

32 Claims, 12 Drawing Sheets

(56) References Cited

U.S. PATENT DOCUMENTS

| | | | |
|---|---|---|---|
| 2015/0363940 A1 | 12/2015 | Held et al. | |
| 2017/0178357 A1* | 6/2017 | Yang | B64D 47/08 |
| 2018/0108146 A1 | 4/2018 | Zhan et al. | |
| 2018/0335787 A1 | 11/2018 | Zeng et al. | |
| 2018/0356498 A1 | 12/2018 | Stachnik et al. | |
| 2019/0302259 A1 | 10/2019 | Van Fleet et al. | |
| 2019/0391249 A1* | 12/2019 | Takeuchi | G01S 13/42 |
| 2020/0003869 A1 | 1/2020 | Yang et al. | |
| 2020/0132850 A1 | 4/2020 | Crouch et al. | |
| 2020/0209352 A1 | 7/2020 | Rao et al. | |
| 2020/0249315 A1 | 8/2020 | Eshet et al. | |
| 2020/0400821 A1* | 12/2020 | Baker | G01S 7/4912 |
| 2022/0058818 A1 | 2/2022 | Qi et al. | |
| 2022/0137202 A1* | 5/2022 | Song | G01S 13/726 |
| | | | 342/109 |

OTHER PUBLICATIONS

Song, et al., "Range Bias Modeling for Hyperbolic-Frequency-Modulated Waveforms in Target Tracking," IEEE Journal of Oceanic Engineering, vol. 37, No. 4, Oct. 2012, pp. 670-679.

Shuyuan, et al., "A Simple Algorithm for Eliminating Doppler Velocity Aliasing," Department of Atmospheric Science, Peking University, Beijing, China, pp. 1-4.

He, et al., "A Radar Radial Velocity Dealiasing Algorithm for Radar Data Assimilation and its Evaluation with Observations from Multiple Radar Networks," Remote Sens. 2019,11, 2457, doi:10.3990/rs11202457, pp. 1-16.

* cited by examiner

SYSTEMS AND METHODS FOR SIMULTANEOUS RANGE-RATE UNWRAPPING AND OUTLIER REMOVAL FOR RADAR

BACKGROUND

Statement of the Technical Field

The present disclosure relates generally to radar systems. More particularly, the present disclosure relates to implementing systems and methods for simultaneous range-rate unwrapping and outlier removal for radar.

DESCRIPTION OF THE RELATED ART

Radar systems are often used for detecting the presence, direction, distance and speed of objects. The objects can include vehicles, ships, aircrafts, pedestrians, animals, trees and/or buildings. During operations, a radar system emits a signal that is reflected off of an object back towards the radar systems. The reflected signal is received by the radar system. The received signal provides information about the object's location and speed. For example, if an object is moving either toward or away from the radar system, the received signal will have a slightly different frequency than the frequency of the emitted signal due to the Doppler effect.

SUMMARY

The present disclosure concerns implementing systems and methods for operating a radar system. The methods comprise, by a processor: receiving point cloud information that was generated by radar devices; grouping data points of the point cloud information to form at least one segment; computing possible true range-rate values for each data point in the at least one segment; identifying a scan window including possible true range-rate values for a largest number of data points; determining whether at least two modulus of the data points associated with the possible true range-rate values included in the identified scan window have moduli values that are different by a certain amount; determining a new range-rate value for each at least one data point of the at least one segment, when a determination is made that at least two modulus of the data points associated with the possible true range-rate values included in the identified scan window have moduli values that are different by the certain amount; and modifying the point cloud information in accordance with the new range-rate value. A determination may be made that at least two modulus have moduli values that are different by the certain amount when that modulus satisfy the constraint $\min_{\{k\_a, k\_b\}} abs(moduli\_a * k\_a - k\_b * moduli\_b) < scanning\_window\_size$. $abs(moduli\_a * k\_a)$ may be less than or equal to $max\_rational\_speed\_on\_road$. $abs(moduli\_b * k\_b)$ may be less than or equal to $max\_rational\_speed\_on\_road$.

In some scenarios, the point cloud information comprises first point cloud information generated by the radar devices during a first cycle and second point cloud information generated by the radar devices during a second cycle. The first and second point cloud information is combined to form consolidated point cloud information for a plurality of data points. Data points of the consolidated point cloud information are grouped to form the at least one segment. The consolidated point cloud information is modified to include the new range-rate value.

In those or other scenarios, the methods also comprise determining whether at least two modulus of the data points in the at least one segment have moduli values that are different by a certain amount. The possible true range-rate values are computed when a determination is made that at least two modulus of the data points in the at least one segment have moduli values that are different by the certain amount. This determination may be made based on mathematical equation $\min_{\{k\_a, k\_b\}} abs(moduli\_a * k\_a - k\_b * moduli\_b) < scanning\_window\_size$. A flag may be set to a value that indicates the at least one segment comprises unreliable range-rates, when a determination is made that at least two of the data points in the at least one segment have moduli values that are not different by the certain amount.

In those or other scenarios, the methods further comprise removing at least one outlier data point from the at least one segment. The outlier data point comprises a data point having a possible true range-rate value falling outside of the identified scan window. Additionally or alternatively, a flag is set to a value that indicates the at least one segment comprises unreliable range-rates, when a determination is made that at least two modulus of the data points associated with the possible true range-rate values included in the identified scan window have moduli values that are not different by the certain amount.

In those or other scenarios, the modified point cloud information is used to generate at least one possible trajectory for an object located in proximity to the radar system. The possible trajectory for the object is used to determine a vehicle trajectory. A vehicle is caused to follow the vehicle trajectory.

The implementing systems comprise: radar devices configured to generate point cloud information; a processor; and/or a non-transitory computer-readable storage medium comprising programming instructions. The programming instructions are configured to cause the processor to implement a method for operating a radar system. The programming instructions comprise instructions to: receive point cloud information generated by the radar devices; group data points of the point cloud information to form at least one segment; compute possible true range-rate values for each data point in the at least one segment; identify a scan window including possible true range-rate values for a largest number of data points; determine whether at least two modulus of the data points associated with the possible true range-rate values included in the identified scan window have moduli values that are different by a certain amount; determine a new range-rate value for each at least one data point of the at least one segment, when a determination is made that at least two modulus of the data points associated with the possible true range-rate values included in the identified scan window have moduli values that are different by the certain amount; and modify the point cloud information in accordance with the new range-rate value. A determination may be made that at least two modulus have moduli values that are different by the certain amount when that modulus satisfy the constraint $$\min_{\{k\_a,k\_b\}} abs(moduli\_a * k\_a - k\_b * moduli\_b) < scanning\_window\_size.$$

In some scenarios, the point cloud information comprises first point cloud information generated by the radar devices during a first cycle and second point cloud information generated by the radar devices during a second cycle. The programming instructions also comprise instructions to combine the first and second point cloud information to form consolidated point cloud information for a plurality of data points. The data points of the consolidated point cloud information are grouped to form the at least one segment. The consolidated point cloud information is modified to include the new range-rate value.

The programming instructions may further comprise instructions to determine whether all of the data points in the at least one segment have a same moduli. The possible true range-rate values are computed when a determination is made that at least two modulus of the data points in the at least one segment have moduli values that are different by a certain amount. A flag is set to a value that indicates the at least one segment comprises unreliable range-rates, when a determination is made that at least two modulus of the data points in the at least one segment have moduli values that are not different by the certain amount.

The programming instructions may comprise instructions to remove at least one outlier data point from the at least one segment. The outlier data point comprises a data point having a possible true range-rate value falling outside of the identified scan window. A flag may be set to a value that indicates the at least one segment comprises unreliable range-rates, when a determination is made that at least two modulus of the data points associated with the possible true range-rate values included in the identified scan window have moduli values that are not different by the certain amount.

The programming instructions may comprise instructions to: use the modified point cloud information to generate at least one possible trajectory for an object located in proximity to the radar system; use the at least one possible trajectory for the object to determine a vehicle trajectory; and/or cause a vehicle to follow the vehicle trajectory.

BRIEF DESCRIPTION OF THE DRAWINGS

The present solution will be described with reference to the following drawing figures, in which like numerals represent like items throughout the figures.

DETAILED DESCRIPTION

Figure 1:
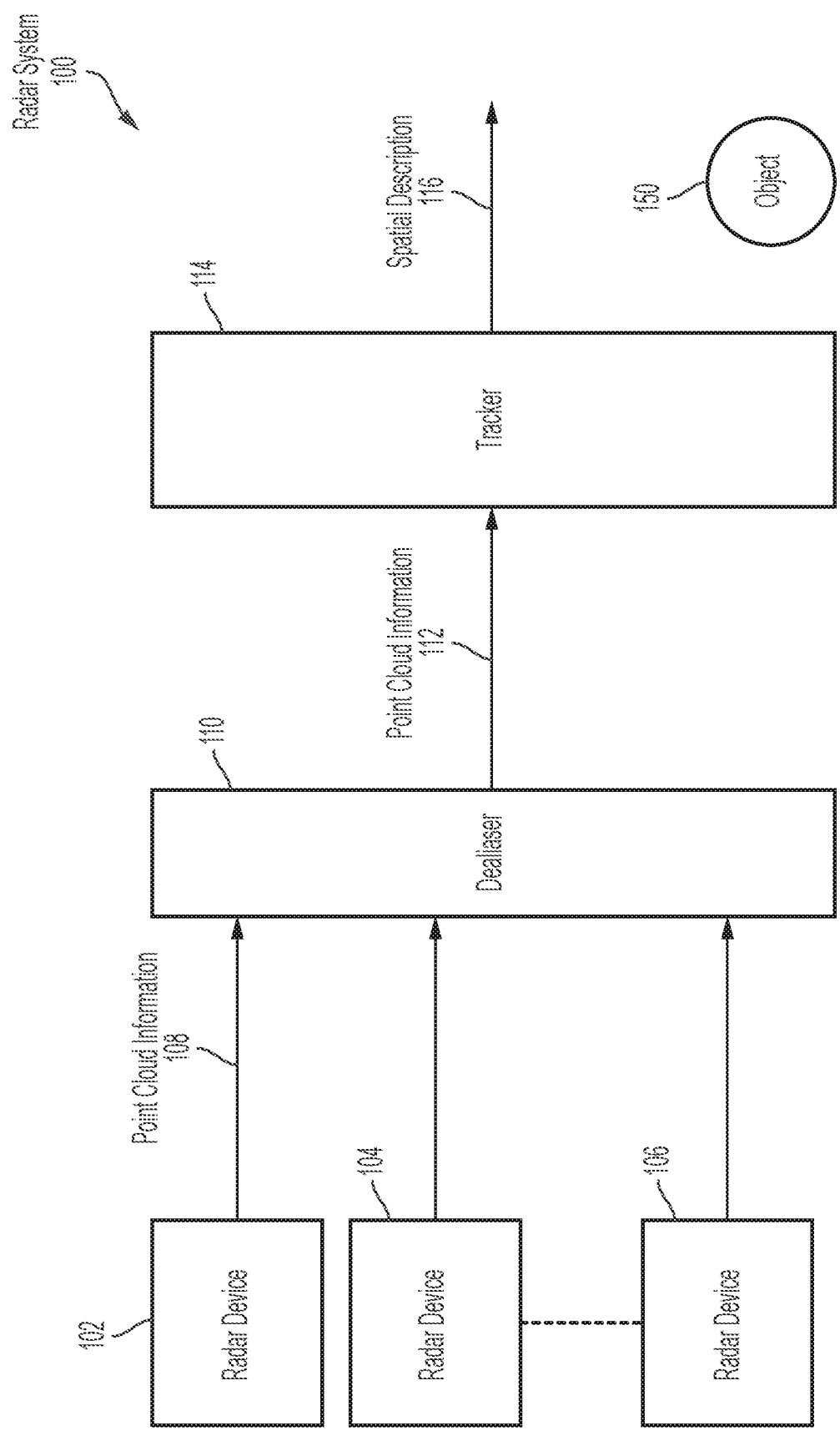
FIG. 1 provides an illustration of an illustrative radar system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or a human operator may override the vehicle's autonomous system and may take control of the vehicle, or it may be a human-operated vehicle equipped with an advanced driver assistance system.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Illustrative Radar Systems

The present solution concerns a radar system for detecting the presence, direction, distance and speed of objects, which may include moving actors, stationary objects, or both. The objects can include vehicles, ships, aircrafts, pedestrians, animals, trees and/or buildings. An illustration of an illustrative radar system 100 is provided in FIG. 1. As shown in FIG. 1, the radar system 100 comprises a plurality of radar devices 102, 104, 106. Although three radar devices are shown in FIG. 1. The present solution is not limited in this regard. The radar system can include any number of radar devices selected in accordance with a given application. An illustrative architecture for a radar device will be discussed below in relation to FIG. 1. The radar system 100 also comprises a dealiaser 110 and a tracker 114. The dealiaser 110 and/or tracker 114 can include, but is(are) not limited to, a computing device such as that shown in FIG. 10.

During operation, each radar device 102, 104, 106 emits a signal that is reflected off of an object 150 back towards the radar device. The reflected signal is received by the radar device 102, 104, 106. The received signal provides information about the object's location and speed. For example, if the object 150 is moving either toward or away from the radar system 100, the received signal will have a slightly different frequency than the frequency of the emitted signal due to the Doppler effect. The radar device processes the received signal and generates a point cloud including a plurality of data points. Point clouds are well known in the art. Point cloud information 108 is communicated from the radar device to the dealiaser 110. The point cloud information 108 includes, but is not limited to, a signal strength, a range value, a range-rate value, an angle value, and a moduli for each point in the cloud. The range-rate value indicates a rate that the object 150 moves toward or away from the radar system 100. For example, a negative range-rate value indicates that the object 150 is moving away from the radar system 100 at a certain velocity, while a positive range-rate value indicates that the object 150 is moving towards the radar system 100 at a certain velocity. The present solution is not limited to the particulars of this example.

The dealiaser 110 processes the point cloud information received from the radar devices 102, 104, 106 to address errors in the range-rate values. The manner in which the point cloud information is processed will become evident as the discussion progresses. This processing produces point cloud information 112. The point cloud information 112 includes, but is not limited to, the following information for each point in the cloud: a signal strength; a range value; an original range-rate value or a corrected range-rate value; an angle value; and a moduli. The point cloud information 112 is also referred to herein as reduced point cloud information because it may be absent of outlier data points contained in the point cloud information 108. The manner in which outlier data points are identified by the dealiaser 110 will become evident as the discussion progresses. The point cloud information 112 is then passed to the tracker 114. At the tracker 114, the point cloud information 112 is used to generate a spatial description 116 for the object 150. The spatial description 116 includes, but is not limited to, a location and a velocity (i.e., speed plus a direction of travel).

Figure 2:
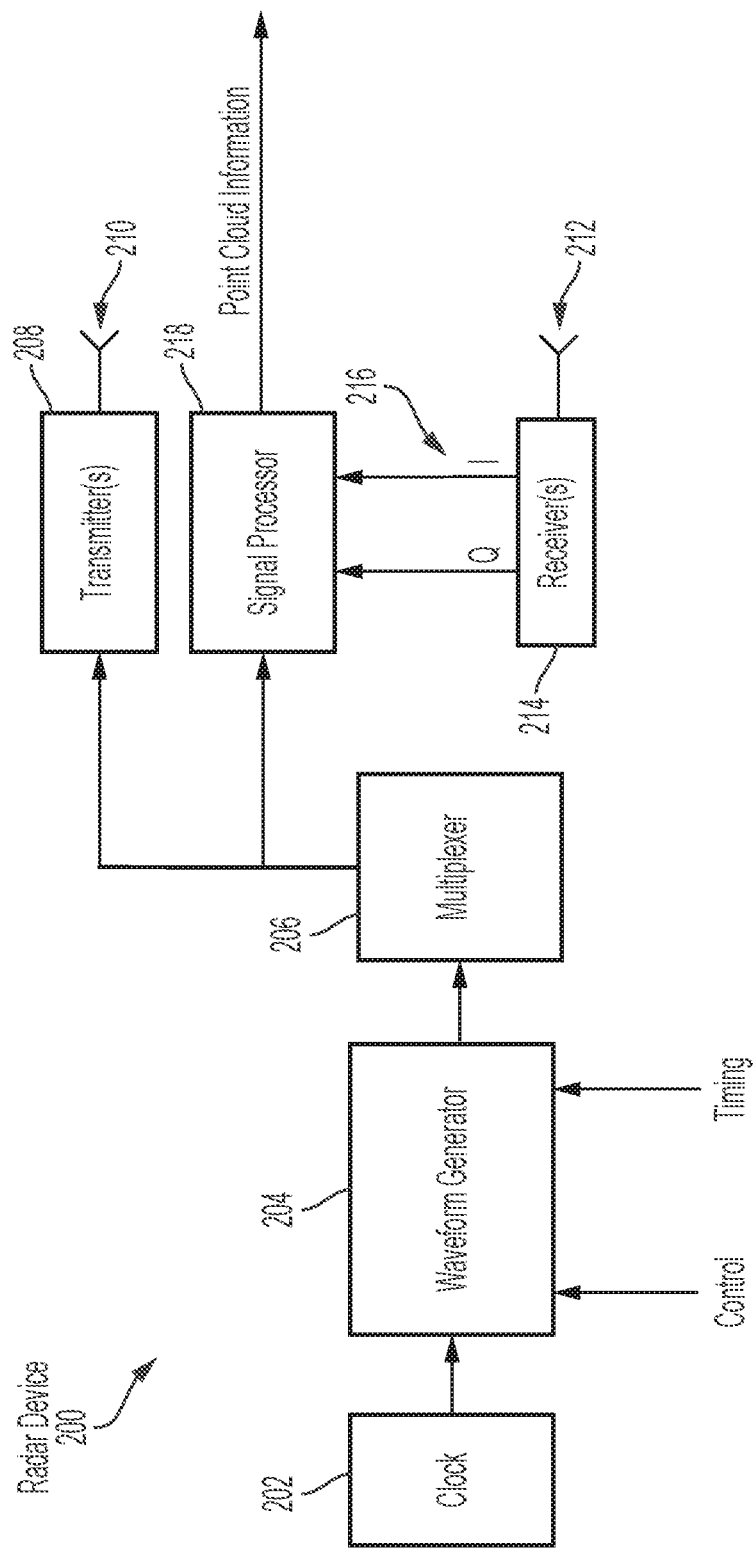
FIG. 2 provides an illustration of an illustrative radar device.

Referring now to FIG. 2, there is provided an illustration of an illustrative radar device 200. Radar devices 102, 104, 106 of FIG. 1 are the same as or similar to radar device 200. Thus, the following discussion of radar device 200 is sufficient for understanding radar devices 102, 104, 106.

As shown in FIG. 2, the radar device 200 comprises a clock 202 and a waveform generator 204. The waveform generator 204 is capable of producing a suitable waveform for range determination. The waveform can include, but is not limited to, a continuous-time signal. The radar device 200 is configured to operate in two modes, namely a near range mode and a far range mode. The peak power of the continuous-time signal generated in the near range mode is less than the peak power of the continuous-time signal generated in the far range mode. Also, the pulse length of the continuous-time signal generated in the near range mode is shorter than the pulse length of the continuous-time signal generated in the far range mode.

The radar device 200 also comprises a multiplexer 206, at least one transmitter 208, a signal processor 218, an antenna assembly (with transmitting element(s) 210 and receiving element(s) 212), and at least one receiver 214. The signal processor 130 is configured to generate point cloud information based on received signals.

During operations, the waveform generator 204 may generate a continuous-time signal. The continuous-time signal is emitted from the transmitting element 210 in a predetermined direction. The continuous-time signal may reflect off an object (e.g., object 150 of FIG. 1) back towards the radar device 200. The reflected continuous-time signal is received by the receiving element 212, and passed to the receiver 214. The received continuous-time signal provides information about the object's location and velocity. For example, if an object is moving either toward or away from the radar device 200, the received continuous-time signal will have a slightly different frequency than the frequency of the emitted continuous-time signal due to the Doppler effect. Accordingly, the receiver 214 processes the received continuous-time signal to convert the same to a discrete-time signal including a sequence of samples. Each sample of the sequence has I and Q components, and therefore is referred to herein as an IQ sample. The IQ samples are passed to the signal processor 218. The signal processor 218 uses the IQ samples to reconstruct/recover a signal, and generate point cloud information. The point cloud information includes, but is not limited to, a signal strength, a range value, a range-rate value, an angle value, and a moduli value for each point in the cloud.

Figure 3:
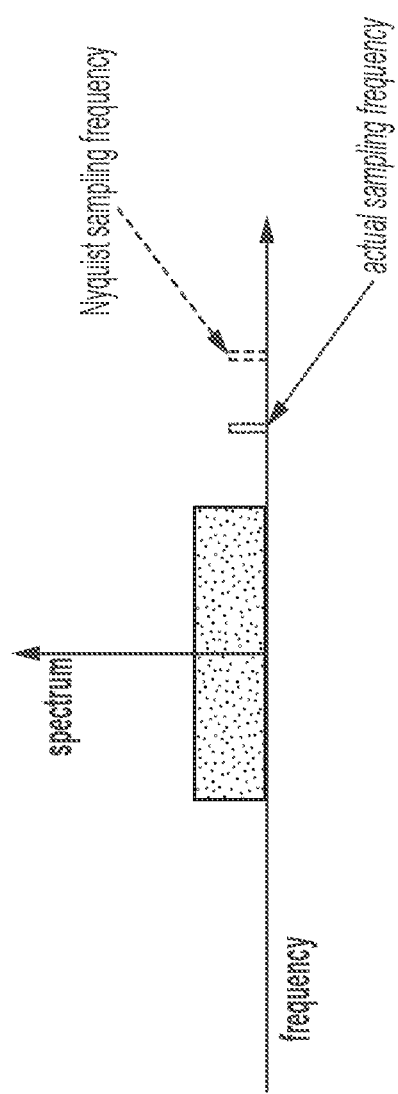
FIG. 3 provides a graph that is useful for understanding the present solution.

With reference to FIG. 3, the received continuous-time signal may have a frequency falling within $[-f_{max}, f_{max}]$. Based on sampling theory, the signal can be completely recovered by the IQ samples if the sampling frequency fs satisfies $fs \geq 2f_{max}$, where $2f_{max}$ is defined as the signal bandwidth. Aliasing occurs if $fs < 2f_{max}$. The term "aliasing", as used here, refers to the distortion or artifact that results when a signal reconstructed from IQ samples is different from the original received continuous-time signal. The distortion or artifact results in a misidentification of the continuous-time signal's frequency or a determination of an incorrect frequency for the continuous-time signal. Any frequency higher than fs/2 is folded into $[-fs/2, fs/2]$. Mathematically, the truth frequency $f_{true}$ and its measured frequency $f_{measure}$ in samples are constrained by $f_{measure} = f_{true} + kfs$, where k is an integer, and $[-fs/2 \leq f_{measure} < fs/2]$. In addition, since the range-rate can be uniquely mapped to the frequency via $f=2v/\lambda$ (where $\lambda$ is the wavelength), the frequency relationship can be converted into a range-rate domain in accordance with the following mathematical equation: $v_{measure} = v_{true} + kB$, where B represents the equivalent range-rate sampling width. The range-rate unwrapping refers to the interference of $v_{true}$ with the knowledge of $f_{measure}$ and B, but with k missing.

The received continuous-time signal may be undersampled in the range-rate domain. Thus, the dealiaser 110 of the radar system 100 implements de-aliasing operations so that the Doppler information can be used to accurately determine the object's location and velocity. The de-aliasing operations of the dealiaser 110 are based on the following Theorem.

Theorem: Let $n_p$ be integers greater than 1, where $1 \leq p \leq P$. Suppose that the integers are pairwise coprime. Then, a number $0 \leq x \leq N$ could be uniquely determined by its remainders $a_p = x \bmod n_p$, where $N = n_1 \cdot n_2 \cdot \ldots n_P$. Based on the Theorem, a coprime moduli is needed to unwrap the range-rate. In some scenarios, the sampling range-rate bandwidth in the near range mode of the radar device 200 is 30 m/s, and the sampling range-rate bandwidth in the far range mode of the radar device 200 is 55 m/s. Cross-information from multiple radar devices may additionally be used to unwrap the range-rate. In some scenarios, coprime is defined for integers. However, in the present system 100, the moduli may not be integral. For example, positive numbers are frequency used as moduli, e.g., moduli=30.12 or moduli=51.23. Two modules moduli_a and moduli_b are used in system that meet the mathematical equation (1)

$$\min\_\{k\_a,k\_b\}\text{abs}(\text{moduli}\_a*k\_a-k\_b*\text{moduli}\_b) < \text{scanning\_window\_size}, \quad (1)$$

where abs(moduli_a*k_a)≤max_rational_speed_on_road and abs(moduli_b*k_b)≤max_rational_speed_on_road.

In some scenarios, the value of max_rational_speed_on_road can be chosen based on traffic conditions. For example, if traffic is relatively crowded, then there is less chance to get a high speed target. Hence, a small value is chosen (e.g., 10 m/s) for max_rational_speed_on_road for an object. If the environment is free of traffic, then a large value is chosen (e.g., 90 m/s) for max_rational_speed_on_ road for an object. Specific examples are provided below. Suppose a vehicle is on the highway, a large value is used for the maximum speed of the object. However, the potential range-rate true value is only inferred along one direction (e.g., from 0-90 m/s only (discard −90-0 m/s), as there is a low probability that the object will travel inversely at a high speed. Two examples are provided below.

Suppose the scanning_window_size is equal to 1 and max_rational_speed_on_road is equal to 90 m/s, the range-rate is unable to be well dealiase of moduli_a is equal to 30.1 and moduli_b is equal to 30.2 as the moduli are close in value. However, if moduli_a is equal to 30.1 and moduli_b is equal to 50.3, they are able to be unwrapped because their values are significantly different.

Suppose the scanning_window_size is equal to 1 and max_rational_speed_on_road is equal to 90 m/s, the range-rate is unable to be well dealiase of moduli_a is equal to 60.1 and moduli_b is equal to 30.2 because 2*moduli_b is close in value to moduli_a.

Figure 4A:
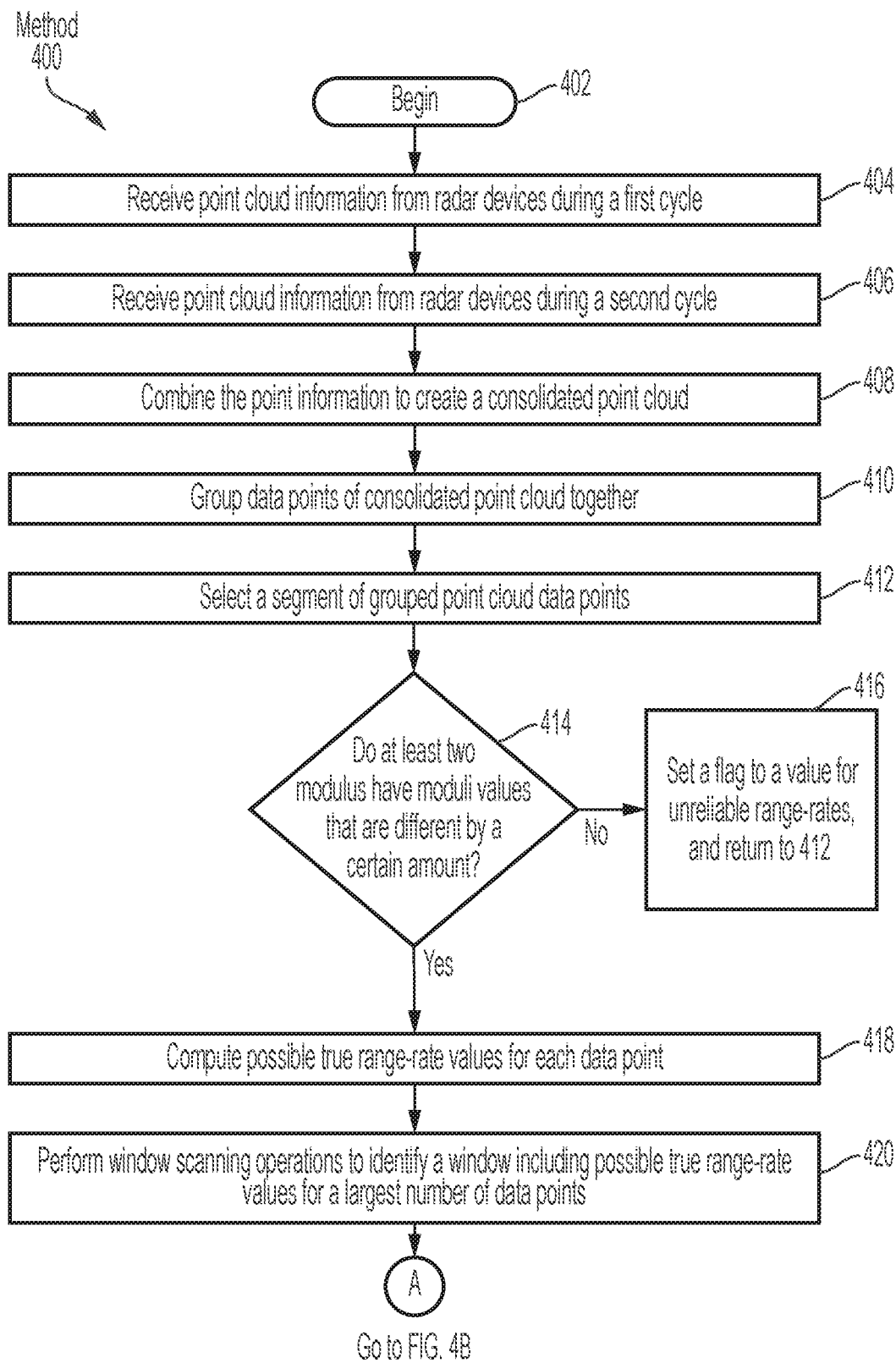
FIGS. 4A-4B (collectively referred to as "FIG. 4") provide a flow diagram for operating the radar system of FIG. 1.

Referring now to FIG. 4, there is provided an illustrative method 400 for operating a radar system (e.g., radar system 100 of FIG. 1). Method 400 comprises a plurality of operations 402-434. These operations can be performed in a different order than that shown in FIG. 4. For example, the outlier operations of 422 can alternatively be performed subsequent to the operations 424-430.

Method 400 begins with 402 and continues with 404 where point cloud information (e.g., point cloud information 108 of FIG. 1) is received by a dealiaser (e.g., dealiaser 110 of FIG. 1) from a plurality of radar devices (e.g., radar devices 102, 104, 106 of FIG. 1) during a first cycle. In 406, the dealiaser receives point cloud information from the radar devices during a second cycle. The point cloud information from the first and second cycles are combined together in 408 to create a consolidated point cloud including data points contained in both sets of point cloud information. Data points of the consolidated point cloud are grouped together to form a plurality of point cloud data segments. The grouping of data points is based on point distances (i.e., each representing a distance between two given points) and signal strengths associated with the data points.

In 412, a segment is selected from the plurality of segments formed in 410. A determination is made in 414 as to whether at least two modulus of the data points in the selected segment have moduli values that are different by a certain amount. This determination is made based on the following mathematical equation (2).

$$\min\_\{k\_a,k\_b\}\text{abs}(\text{moduli}\_a*k\_a-k\_b*\text{moduli}\_b) < \text{scanning\_window\_size}. \quad (2)$$

The following examples are provided to further explain this determination.

Suppose three detection have been made which are represented by three data points $p1_0$, $p2_0$, $p3_0$ of a given segment $S_0$. The moduli for data point $p1_0$ is 30.1. The moduli for data point $p2_0$ is 30.2. The moduli for data point $p3_0$ is 50.1. The moduli are able to be dealiased as 30.1 and 50.1 to meet the constraint of mathematical equation (2), and therefore a determination is made that at least two modulus of the data points have moduli values that are different by the certain amount.

Suppose three detection have been made which are represented by three data points $p1_0'$, $p2_0'$, $p3_0'$ of a given segment $S_0'$. The moduli for data point $p1_0'$ is 30.1. The moduli for data point $p2_0'$ is 30.2. The moduli for data point $p3_0'$ is 30.3. There is no moduli pair that satisfy the constraint, and therefore a determination is made that at least two modulus of the data points have moduli values that are not different by the certain amount.

As noted above, the moduli values for the data points are included in the point cloud information. Illustrative point cloud information for three data points $p1_1$, $p2_1$, $p3_1$ of a given segment $S_1$ is provided below.

$p1_1$: (signal strength=$s_1$, range=10, angle=11, range-rate=5.0 m/s, moduli=30)
$p2_1$: (signal strength=$s_2$, range=10.1, angle=11.1, range-rate=5.3 m/s, moduli=30)
$p3_1$: (signal strength=$s_3$, range=10.1, angle=11.1, range-rate=5.1 m/s, moduli=30)

All points of segment S have the same moduli value of 30. In this scenario, a determination is made that all of the data points $p1_1$, $p2_1$, $p3_1$ of segment $S_2$ do have the same moduli, and therefore do not satisfy mathematical equation (2).

Illustrative point cloud information for three data points $p1_2$, $p2_2$, $p3_2$ of another given segment $S_2$ is provided below.

$p1_2$: (signal strength=$s_1$, range=10, angle=11, range-rate=5.0 m/s, moduli=30)
$p2_2$: (signal strength=$s_2$, range=10.1, angle=11.1, range-rate=5.3 m/s, moduli=30)
$p3_2$: (signal strength=$s_3$, range=10.1, angle=11.1, range-rate=55.1 m/s, moduli=50)

Points $p1_2$ and $p2_2$ have the same moduli value of 30, but point $p3_2$ has a different moduli value of 50. In this scenario, a determination is made that all of the data points $p1_2$, $p2_2$, $p3_2$ of segment $S_2$ do not have the same moduli and at least two moduli are significantly different. Therefore, a moduli pair exists that satisfy the constraint of mathematical equation (2).

If a determination is made that at least two modulus do not satisfy the constraint of mathematical equation (2) (e.g., the points of a given segment have the same moduli or moduli relatively close in value) [414: NO], then 416 is performed where a flag for the segment is set to a value for indicating that the segment includes unreliable range-rates. For example, a flag is set for segment $S_1$ that it includes unreliable range-rates. Method 400 also returns to 412 so that a next segment can be selected for processing.

If a determination is made that at least two modulus do not satisfy the constraint of mathematical equation (2) (e.g., at least two of the points of a given segment do not have the same moduli or have moduli that are significantly different in value) [414: YES], then 418 is performed where possible true range-rate value for each data point in the segment are computed in accordance with mathematical equation (3).

$$PRR = rr + (k*m) \quad (3)$$

where PRR represents a possible range-rate value, rr represents a range-rate value contained in the point cloud information, k is an integer value falling within a given range s (e.g., −2<k<2, or −75<k<75), and m is a moduli value contained in the point cloud information. In some scenarios, a rational is used to limit the range fork. For example, the values of k are based on object velocity and object motion reality. The present solution is not limited to the particulars of this example.

For example, the possible true range-rate values for the segment $S_2$ are computed as follows for k values equal to −2, −1, 0, 1, 2.
$p1_2$: PRR=[5+(−2*30), 5+(−1*30), 5+(0*30), 5+(1*30), 5+(2*30)]=[−55, −25, 5, 35, 65]
$p2_2$: PRR=[5.3+(−2*30), 5.3+(−1*30), 5.3+(0*30), 5.3+(1*30), 5.3+(2*30)]=[−54.7, −24.7, 5.3, 35.3, 65.3]
$p3_2$: PRR=[55.1+(−2*50), 55.1+(−1*50), 55.1+(0*50), 55.1+(1*50), 55.1+(2*50)]=[−44.9, 5.1, 55.1, 105.1, 155.1]
The present solution is not limited to the particulars of this example.

Next in 420, window scanning operations are performed to identify a window which includes possible true range-rate values for the largest number of data points in the segment. The size of the window is pre-defined or selected based on range-rate variance and object geometry. For example, the window size is 1 m/s. Accordingly, in one scenario, the window having values falling within a range of 5.0 m/s to 5.9 m/s is identified for segment $S_2$, as shown by box 500 of FIG. 5. In another scenario, a window having values falling within a range of 70.0 m/s to 70.9 m/s is identified for a segment $S_3$, as shown by box 600 of FIG. 6. The present solution is not limited to the particulars of these scenarios.

Figure 4B:
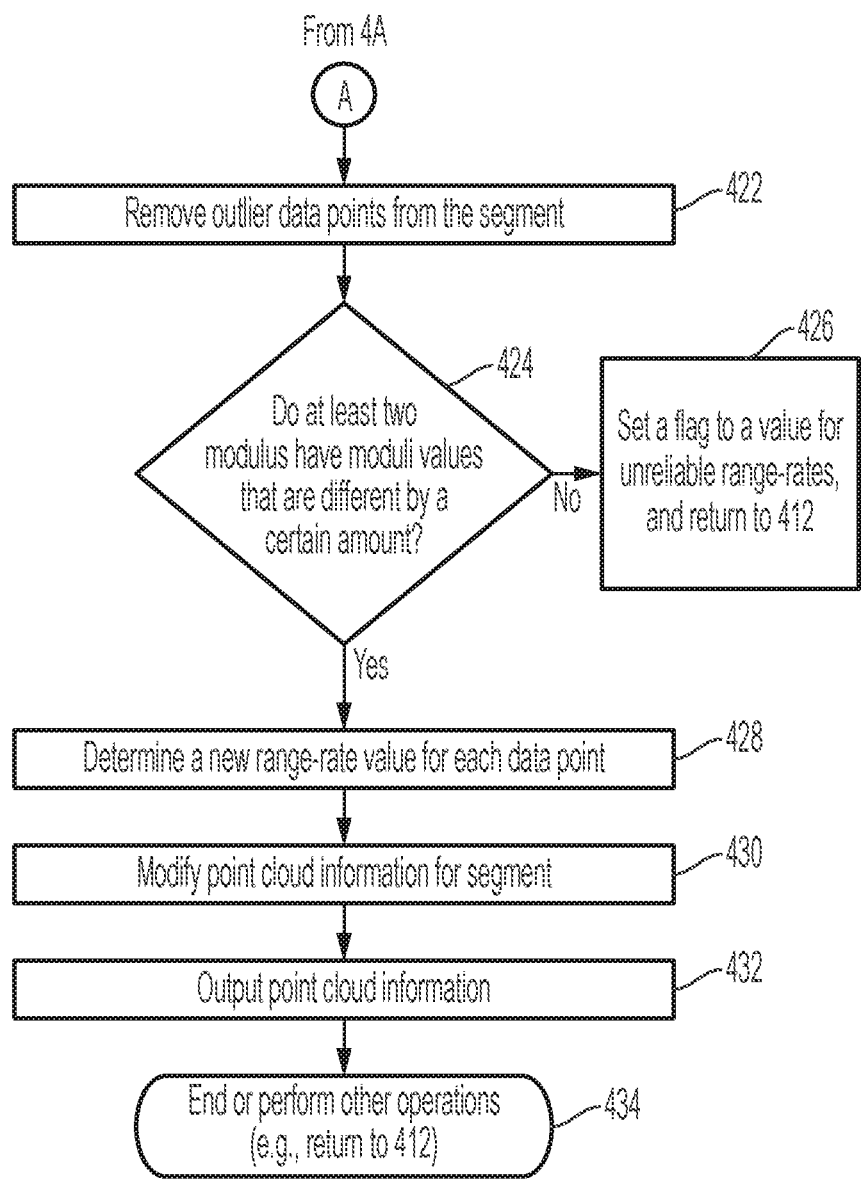

After identifying the window with the largest number of RRR values for the segment, method 400 continues to 422 of FIG. 4B. 422 involves removing outlier data points from the segment. An outlier data point comprises a data point that does not have an RRR value falling within the window. For example, in the scenario of FIG. 6, data point $P4_3$ of segment $S_3$ does not include an RRR value within the window 600. As such, data point $P4_3$ is considered an outlier data point 602, and is therefore removed from the segment $S_3$ such that information associated therewith in not further processed by the dealiaser during method 400. In the scenario of FIG. 7, data point data point $P3_4$ of segment $S_4$ does not include an RRR value within the window 700. As such, data point $P3_4$ is considered an outlier data point 702, and is therefore removed from the segment $S_4$ such that information associated therewith in not further processed by the dealiaser during method 400. The present solution is not limited to the particulars of these examples.

Once the outlier data point(s) have been removed from the segment, method 400 continues with 424. 424 involves determining whether at least two modulus of the remaining data points have moduli values that are different by a certain amount, i.e., a pair of modulus exists that satisfy the constraint of above mathematical equation (2) (e.g., do all of the data points corresponding to the RRR values in the identified window do or do not have the same moduli value or relatively close moduli values). A corresponding data point comprises a remaining data point of the segment with an RRR value falling within the window. If not [424: NO], a flag is set in 426 for the segment. The flag is set to a value for indicating that the segment has unreliable range-rate values. Method 400 also returns to 412 so that a next segment can be selected for processing.

Figure 5:
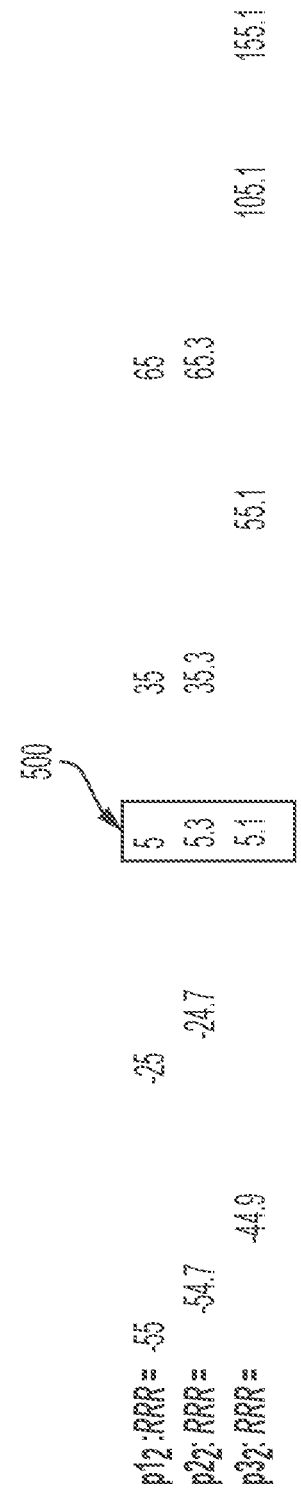
FIGS. 5-7 provide illustrations that are useful for understanding operations of the radar system shown in FIG. 1.

For example, in the scenarios of FIG. 5, all three data points $p1_2$, $p2_2$, $p3_2$ of segment $S_2$ have RRR values falling within the identified window 500. Each data point $p1_2$ and $p2_2$ has a moduli equal to 30, and data point $p3_2$ has a moduli equal to 50. Accordingly, a decision is made in 422 that at least two modulus satisfy the constraint of mathematical equation (2) (e.g., since at least two modulus have moduli values that are significantly different). The present solution is not limited to the particulars of this example.

Figure 6:
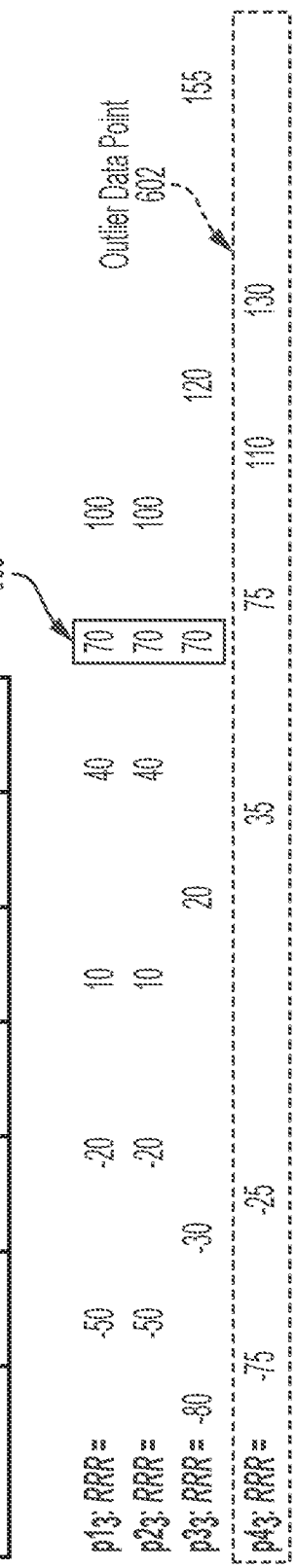
Figure 7:
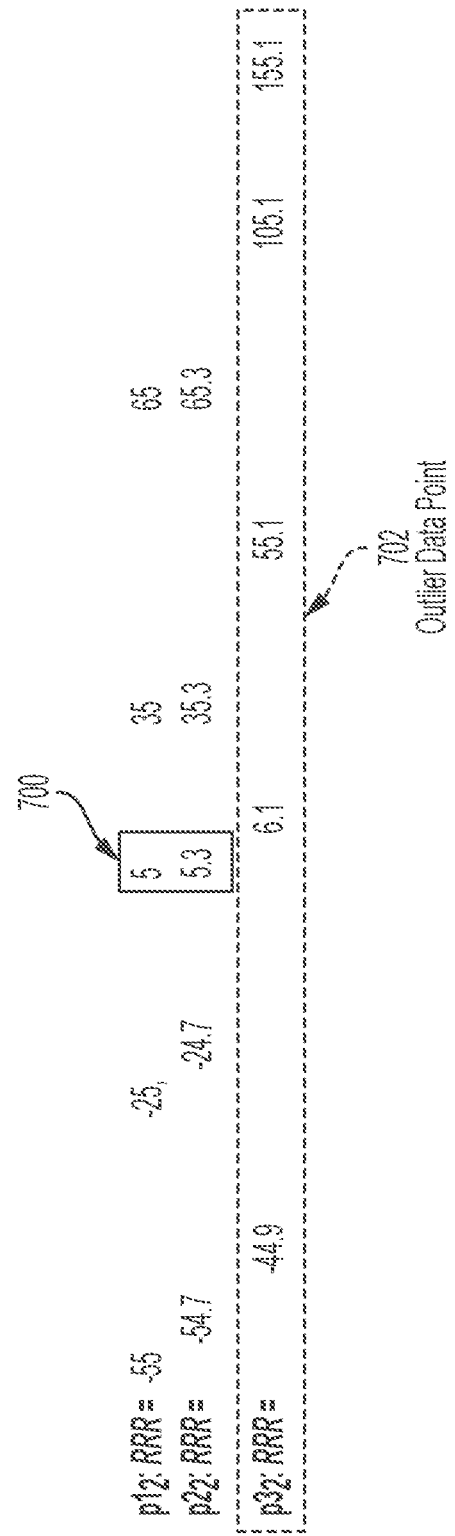

For example, in the scenario of FIG. 6, all three remaining data points $p1_3$, $p2_3$, $p3_3$ of segment $S_3$ have RRR values falling within the identified window 600. Each data point $p1_3$ and $p2_3$ has a moduli equal to 30, and data point $p3_3$ has a moduli equal to 50. Accordingly, a decision is made in 422 that at least two modulus satisfy the constraint of mathematical equation (2) (e.g., since at least two modulus have moduli values that are significantly different). The present solution is not limited to the particulars of this example.

For example, in the scenario of FIG. 7, all two remaining data points $p1_4$, $p2_4$ of segment $S_4$ have RRR values falling within the identified window 700. Each data point $p1_4$ and $p2_4$ has a moduli equal to 30. Accordingly, a decision is made in 422 that all of the corresponding data points $p1_4$, $p2_4$ do have the same moduli value, and therefore the constraint of mathematical equation (2) is not met. A flag is set in relation to segment $S_4$. The present solution is not limited to the particulars of this example.

Referring again to FIG. 4, if a determination is made that at least two modulus satisfy the constraint of mathematical equation (2) (e.g., since at least two modulus have moduli values that are significantly different) [424: YES], then 428 is performed where a new range-rate value for each data point of the segment is determined using a k value associated with the RRR value falling within the identified window. The new range-rate value RRR' is determined in accordance with the above presented mathematical equation (3). For example, in the scenario of FIG. 5, the new range-rate values for the first segment $S_2$ are computed as follows. Note that: k=0 for the RRR value for data point $p1_2$ falling in window 500; k=0 for the RRR value for data point $p2_2$ falling in window 500; and k=−1 for the RRR value for data point $p3_2$ falling in window 500.
$p1_2$: RRR'=range-rate+(k*moduli)=5.0+(0*30)=5.0 m/s
$p2_2$: RRR'=range-rate+(k*moduli)=5.3+(0*30)=5.3 m/s
$p3_2$: RRR'=range-rate+(k*moduli)=55.1+(−1*50)=5.1 m/s Once the new range rate values are determined, method 400 continues with 430 where the point cloud information for the segment is modified accordingly. For example, in the scenario of FIG. 5, the point cloud information for segment $S_2$ is modified as shown below by the arrow.
$p1_2$: (signal strength=$s_1$, range=10, angle=11, range-rate=5.0 m/s, moduli=30)
$p2_2$: (signal strength=$s_2$, range=10.1, angle=11.1, range-rate=5.3 m/s, moduli=30)
$p3_2$: (signal strength=$s_3$, range=10.1, angle=11.1, range-rate=55.1 m/s→5.1 m/s, moduli=50)
The present solution is not limited to the particulars of this example.

Next in 432, the point cloud information is output from the dealiaser. The segments which had a flag set in 416 and/or 426 may be placed in a segment pool for next cycle accumulation and processing. Subsequently, method 400 ends or other operations are performed (e.g., method 400 returns to 412 so that a next segment can be processed).

Illustrative Vehicle Based Systems

The above described radar system 100 can be used in a plurality of applications. Such applications include, but are not limited to, vehicle based applications. The following discussion is provided to illustrate how the radar system 100 of the present solution can be used to facilitate control of a vehicle (e.g., for collision avoidance and/or autonomous driving purposes). The vehicle can include, but is not limited to, an autonomous vehicle.

Figure 8:
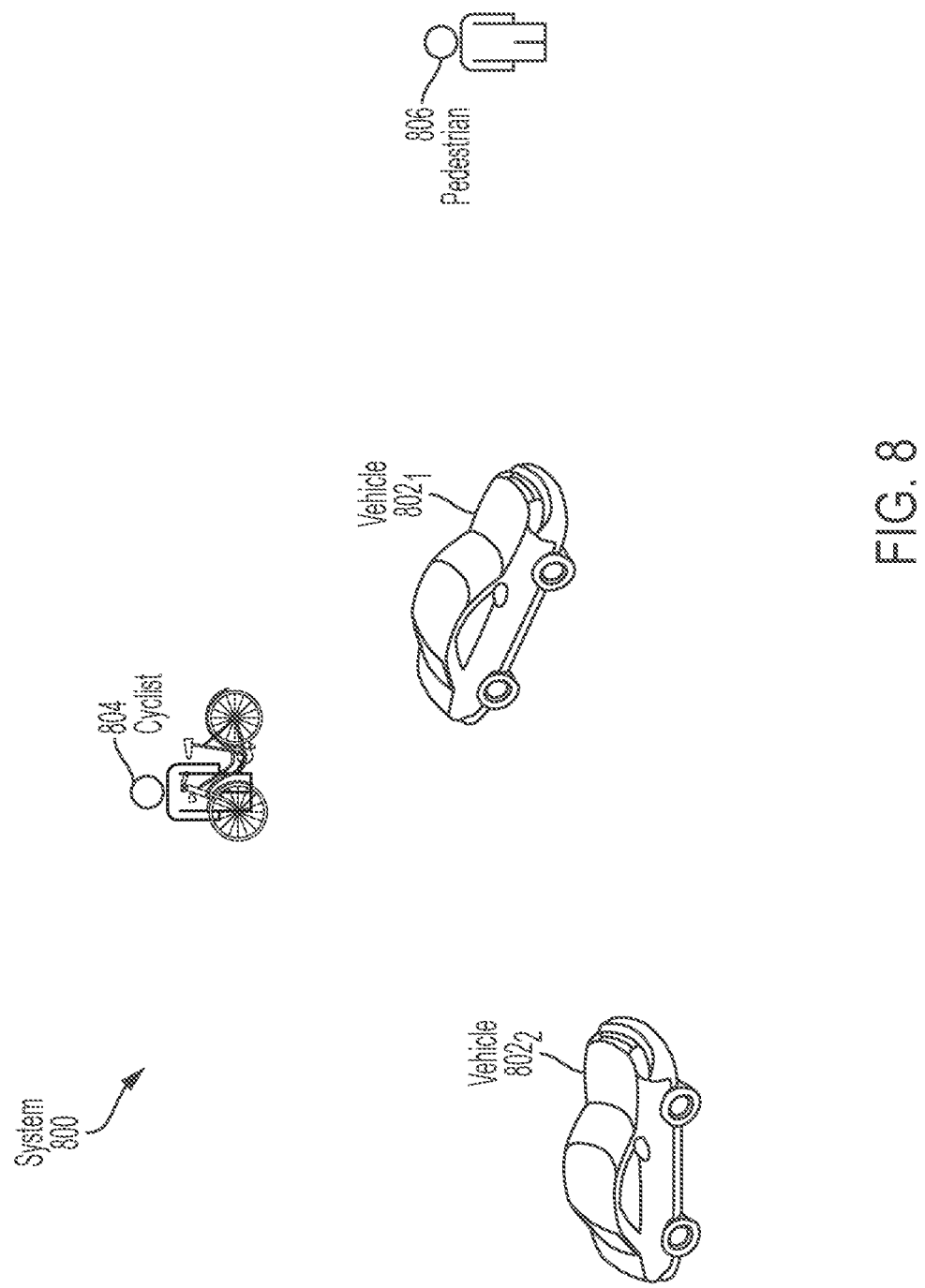
FIG. 8 provides an illustration of a system implementing the radar system described in relation to FIGS. 1-7.

Referring now to FIG. 8, there is provided an illustration of an illustrative system 800. System 800 comprises a vehicle $802_1$ that is traveling along a road in a semi-autonomous or autonomous manner. Vehicle $802_1$ is also referred to herein as an Autonomous Vehicle ("AV"). The AV $802_1$ can include, but is not limited to, a land vehicle (as shown in FIG. 8), an aircraft, or a watercraft.

AV $802_1$ is generally configured to detect objects $802_2$, 804, 806 in proximity thereto. The objects can include, but are not limited to, a vehicle $802_2$, cyclist 804 (such as a rider of a bicycle, electric scooter, motorcycle, or the like) and/or a pedestrian 806. When such a detection is made, AV $802_1$ performs operations to: generate one or more possible object trajectories for the detected object; and analyze at least one of the generated possible object trajectories to determine a vehicle trajectory for AV $802_1$. The AV $802_1$ is then caused to follow the vehicle trajectory.

Figure 9:
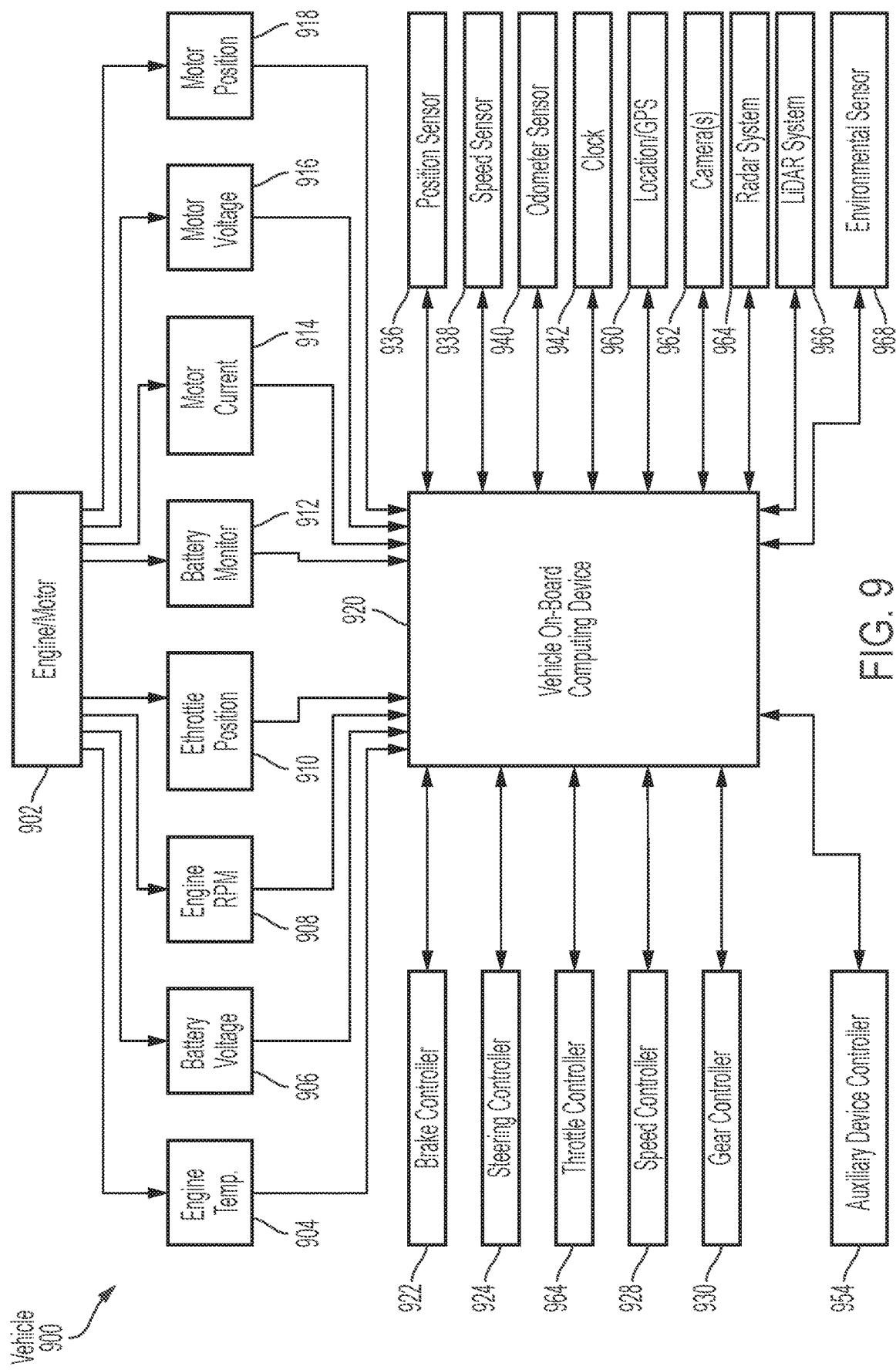
FIG. 9 is an illustration of an illustrative architecture for a vehicle.

Referring now to FIG. 9, there is provided an illustration of an illustrative system architecture 900 for a vehicle. Vehicles $802_1$ and/or $802_2$ of FIG. 8 can have the same or similar system architecture as that shown in FIG. 9. Thus, the following discussion of system architecture 900 is sufficient for understanding vehicle(s) $802_1$, $802_2$ of FIG. 8.

As shown in FIG. 9, the vehicle 200 includes an engine or motor 202 and various sensors 204-218 measuring various parameters of the vehicle. In gas-powered or hybrid vehicles having a fuel-powered engine, the sensors may include, for example, an engine temperature sensor 904, a battery voltage sensor 906, an engine rotations per minute (RPM) sensor 908, and a throttle position sensor 910. If the vehicle is an electric or hybrid vehicle, then the vehicle may have an electric motor, and accordingly will have sensors such as a battery monitoring system 912 (to measure current, voltage and/or temperature of the battery), motor current 914 and temperature 916 sensors, and motor position sensors such as resolvers and encoders 918.

Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 960 (e.g., a Global Positioning System (GPS) device); object detection sensors such as one or more cameras 962; a LiDAR sensor system 966; and/or a radar system 964. Radar system 964 is the same as or similar to radar system 100 discussed above in relation to FIGS. 1-7. As such, the above discussion of radar system 964 is sufficient for understanding radar system 964. The sensors also may include environmental sensors 968 such as a precipitation sensor and/or ambient temperature sensor. The object detection sensors may enable the vehicle on-board computing device 920 to detect objects that are within a given distance range of the vehicle 900 in any direction, while the environmental sensors collect data about environmental conditions within the vehicle's area of travel.

During operations, information is communicated from the sensors to the on-board computing device 920. The on-board computing device 920 analyzes the data captured by the sensors, and optionally controls operations of the vehicle based on results of the analysis. For example, the on-board computing device 920 may control: braking via a brake controller 922; direction via a steering controller 924; speed and acceleration via a throttle controller 926 (in a gas-powered vehicle) or motor speed controller 928 (such as a current level controller in an electric vehicle); a differential gear controller 930 (in vehicles with transmissions); and/or other controllers.

Geographic location information may be communicated from the location sensor 960 to the on-board computing device 920, which may then access a map of the environment that corresponds to the location information to determine known fixed features of the environment such as streets, buildings, stop signs and/or stop/go signals. Captured images from the camera(s) 962 and/or object detection information captured from sensors such as LiDAR is communicated to the on-board computing device 920. The object detection information and/or captured images are processed by the on-board computing device 920 to detect objects in proximity to the vehicle 900. Any known or to be known technique for making an object detection based on sensor data and/or captured images can be used in the embodiments disclosed in this document.

When such an object detection is made, the on-board computing device 920 performs operations to: generate one or more possible object trajectories for the detected object; and analyze at least one of the generated possible object trajectories to determine if there is a risk of a collision in a threshold period of time (e.g., 1 minute). If so, the on-board computing device 920 performs operations to determine whether the collision can be avoided if a given vehicle trajectory is followed by the vehicle 900 and any one of a plurality of dynamically generated emergency maneuvers is performed in a pre-defined time period (e.g., N milliseconds). If the collision can be avoided, then the on-board computing device 920 takes no action to change the vehicle trajectory or optionally causes the vehicle 900 to perform a cautious maneuver (e.g., mildly slows down). In contrast, if the collision cannot be avoided, then the on-board computing device 920 causes the vehicle 900 to immediately take an emergency maneuver (e.g., brakes and/or changes direction of travel).

Figure 10:
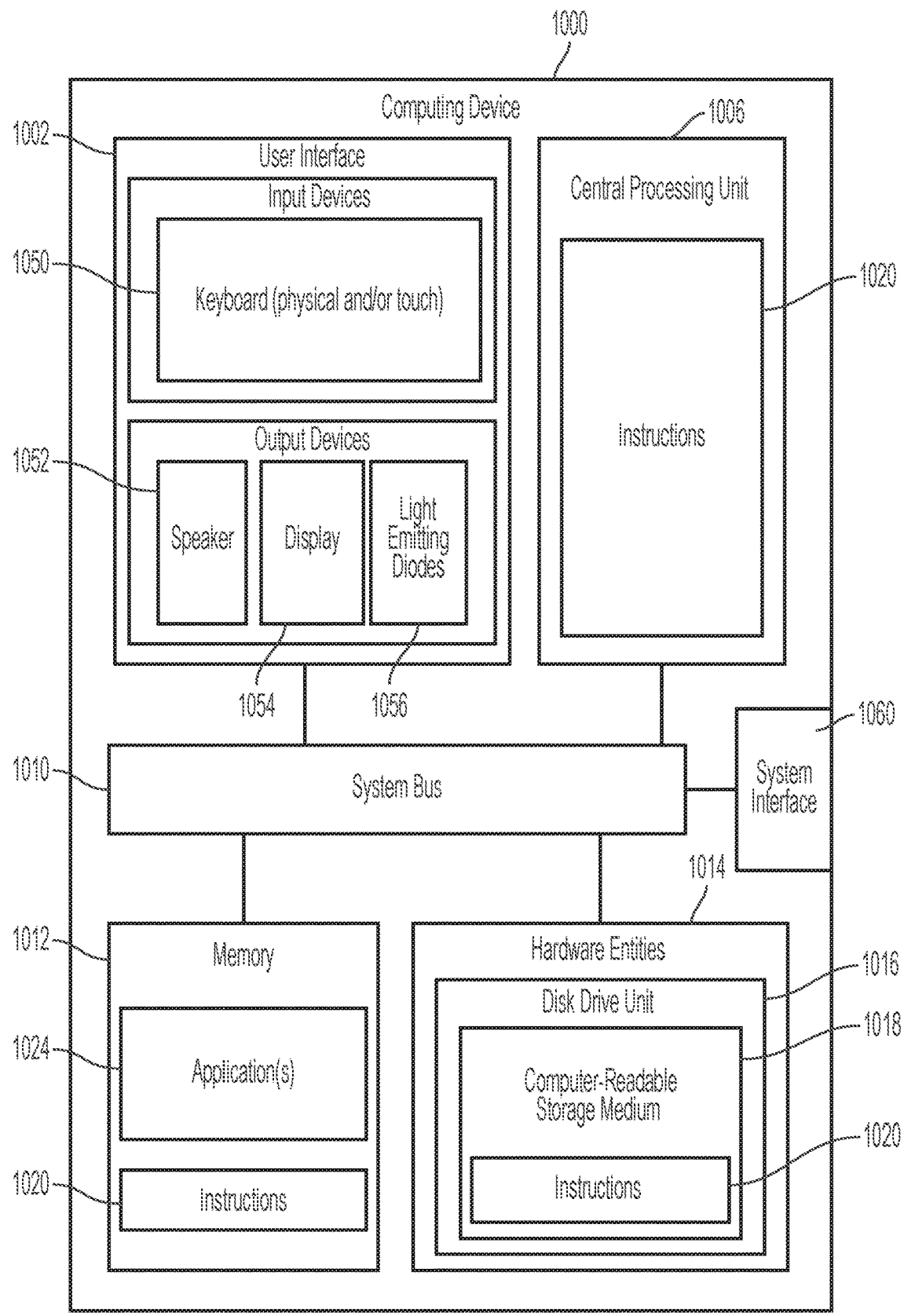
FIG. 10 is an illustration of an illustrative computing device.

Referring now to FIG. 10, there is provided an illustration of an illustrative architecture for a computing device 1000. The dealiaser 110 of FIG. 1, tracker 114 of FIG. 1, radar system 964 of FIG. 9 and/or vehicle on-board computing device 920 of FIG. 9 is at least partially the same as or similar to computing device 1000. As such, the discussion of computing device 1000 is sufficient for understanding the dealiaser 110 of FIG. 1, tracker 114 of FIG. 1, radar system 964 of FIG. 9 and/or vehicle on-board computing device 920 of FIG. 9.

Computing device 1000 may include more or less components than those shown in FIG. 10. However, the components shown are sufficient to disclose an illustrative solution implementing the present solution. The hardware architecture of FIG. 10 represents one implementation of a representative computing device configured to operate a vehicle, as described herein. As such, the computing device 1000 of FIG. 10 implements at least a portion of the method(s) described herein.

Some or all components of the computing device 1000 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 10, the computing device 1000 comprises a user interface 1002, a Central Processing Unit ("CPU") 1006, a system bus 1010, a memory 1012 connected to and accessible by other portions of computing device 1000 through system bus 1010, a system interface 1060, and hardware entities 1014 connected to system bus 1010. The user interface can include input devices and output devices, which facilitate user-software interactions for controlling operations of the computing device 1000. The input devices include, but are not limited to, a physical and/or touch keyboard 1050. The input devices can be connected to the computing device 1000 via a wired or wireless connection (e.g., a Bluetooth® connection). The output devices include, but are not limited to, a speaker 1052, a display 1054, and/or light emitting diodes 1056. System interface 1060 is configured to facilitate wired or wireless communications to and from external devices (e.g., network nodes such as access points, etc.).

At least some of the hardware entities 1014 perform actions involving access to and use of memory 1012, which can be a Random Access Memory ("RAM"), a disk drive, flash memory, a Compact Disc Read Only Memory ("CD-ROM") and/or another hardware device that is capable of storing instructions and data. Hardware entities 1014 can include a disk drive unit 1016 comprising a computer-readable storage medium 1018 on which is stored one or more sets of instructions 1020 (e.g., software code) configured to implement one or more of the methodologies, procedures, or functions described herein. The instructions 1020 can also reside, completely or at least partially, within the memory 1012 and/or within the CPU 1006 during execution thereof by the computing device 1000. The memory 1012 and the CPU 1006 also can constitute machine-readable media. The term "machine-readable media", as used here, refers to a single medium or multiple media (e.g., a centralized or distributed database, and/or associated caches and servers) that store the one or more sets of instructions 1020. The term "machine-readable media", as used here, also refers to any medium that is capable of storing, encoding or carrying a set of instructions 1020 for execution by the computing device 1000 and that cause the computing device 1000 to perform any one or more of the methodologies of the present disclosure.

Figure 11:
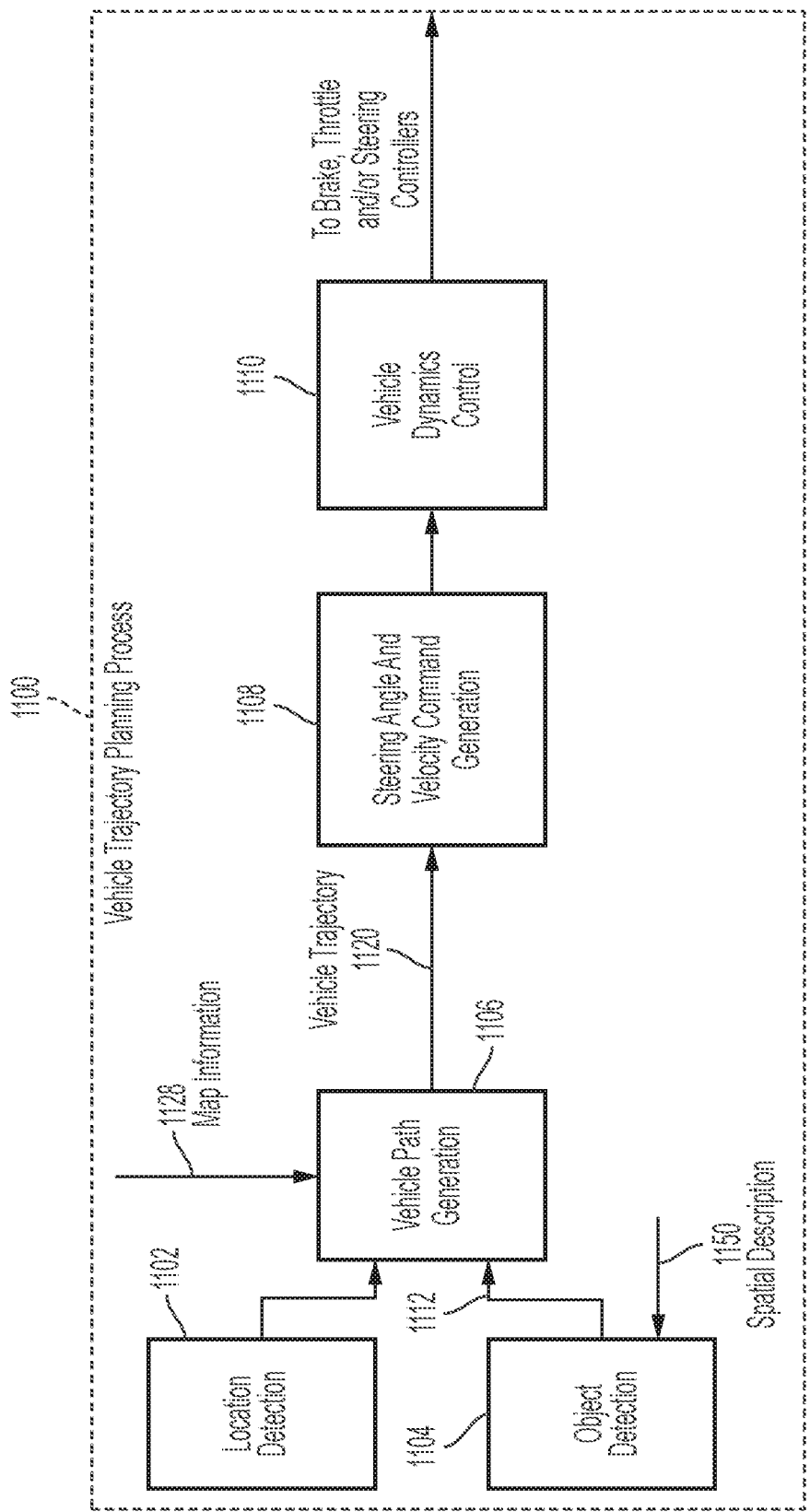
FIG. 11 provides a block diagram that is useful for understanding how control of a vehicle is achieved in accordance with the present solution.

Referring now to FIG. 11, there is provided a block diagram that is useful for understanding how vehicle control is achieved in accordance with the present solution. All of the operations performed in blocks 1102-1110 can be performed by the on-board computing device (e.g., vehicle on-board computing device 920 of FIG. 9) of a vehicle (e.g., AV $802_1$ of FIG. 8).

In block 1102, a location of the vehicle is detected. This detection can be made based on sensor data output from a location sensor (e.g., location sensor 960 of FIG. 9) of the vehicle. This sensor data can include, but is not limited to, Global Positioning System ("GPS") data. The detected location of the vehicle is then passed to block 1106.

In block 1104, an object is detected within proximity of the vehicle. This detection is made based on sensor data output from a radar system (e.g., radar system 100 of FIG. 1, and/or radar system 964 of FIG. 9), a LiDAR system (e.g., a LiDAR system 966 of FIG. 9) and/or a camera (e.g., camera 962 of FIG. 9) of the vehicle. The sensor data output from the radar system includes, but is not limited to, a spatial description 1150 for the object. The spatial description 1150 is the same as or similar to spatial description 116 of FIG. 1. The sensor data is also used to determine one or more possible object trajectories for the detected object. The possible object trajectories can include, but are not limited to, the following trajectories:

a trajectory defined by the object's actual speed (e.g., 1 mile per hour) and actual direction of travel (e.g., west);

a trajectory defined by the object's actual speed (e.g., 1 mile per hour) and another possible direction of travel (e.g., south, south-west, or X (e.g., 40°) degrees from the object's actual direction of travel in a direction towards the AV) for the object;

a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The one or more possible object trajectories 1112 is(are) then passed to block 1106.

In block 1106, a vehicle trajectory 1120 is generated using the information from blocks 1102 and 1104. Techniques for determining a vehicle trajectory are well known in the art, and therefore will not be described herein. Any known or to be known technique for determining a vehicle trajectory can be used herein without limitation. In some scenarios, the vehicle trajectory 1120 is determined based on the location information from block 1102, the object detection/trajectory information from block 1104, and map information 1128 (which is pre-stored in a data store of the vehicle). The vehicle trajectory 1120 represents a smooth path that does not have abrupt changes that would otherwise provide passenger discomfort. The vehicle trajectory 1120 is then provided to block 1108.

In block 1108, a steering angle and velocity command is generated based on the vehicle trajectory 1120. The steering angle and velocity command is provided to block 1110 for vehicle dynamics control. The vehicle dynamics control cause the vehicle to decelerate, cause the vehicle to accelerate, and/or cause the vehicle to change its direction of travel.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a radar system, comprising:
receiving, by a processor, point cloud information that was generated by radar devices;
grouping, by the processor, data points of the point cloud information to form at least one segment;
computing, by the processor, possible true range-rate values for each data point in the at least one segment, each said possible true range-rate value being a function of at least a moduli value contained in the point cloud information and a range-rate value contained in the point cloud information;
identifying, by the processor, a scan window including possible true range-rate values for a largest number of data points;
determining, by the processor, whether at least two modulus of the data points associated with the possible true range-rate values included in the identified scan window have moduli values that are different by a certain amount;
determining, by the processor, a new range-rate value for each at least one data point of the at least one segment, when a determination is made that the at least two modulus of the data points associated with the possible true range-rate values included in the identified scan window do not have moduli values that are different by the certain amount; and
modifying, by the processor, the point cloud information in accordance with the new range-rate value.

2. The method according to claim 1, wherein the point cloud information comprises first point cloud information generated by the radar devices during a first cycle and second point cloud information generated by the radar devices during a second cycle.

3. The method according to claim 2, further comprising combining the first and second point cloud information to form consolidated point cloud information for a plurality of data points.

4. The method according to claim 3, wherein the data points of the consolidated point cloud information are grouped to form the at least one segment.

5. The method according to claim 4, wherein the consolidated point cloud information is modified to include the new range-rate value.

6. The method according to claim 1, wherein a determination is made that at least two modulus of the data points associated with the possible true range-rate values included in the identified scan window have moduli values that are different by a certain amount when that at least two modulus satisfy mathematical equation $$\min\{k\_a,k\_b\}\text{abs}(\text{moduli}\_a * k\_a - k\_b * \text{moduli}\_b) < \text{scanning\_window\_size},$$

where k_a represents a first value of a set of known integer values that is associated with one of the possible true range rate values computed for a first data point, k_b represents a second value of the set of known integer values that is associated with a one of the possible true range rate values computed for a second data point, moduli_a represents a moduli value associated with the first data point in the point cloud information, moduli_b represents a moduli value associated with the second data point in the point cloud information, and scanning_window_size represents a size of the scan window.

7. The method according to claim 1, further comprising determining whether at least two modulus of the data points in the at least one segment have moduli values that are different by a certain amount.

8. The method according to claim 7, wherein a determination is made that at least two modulus of the data points in the at least one segment have moduli values that are different by a certain amount when that at least two modulus satisfy mathematical equation $$\min\_\{k\_a,k\_b\}\text{abs}(\text{moduli}\_a * k\_a - k\_b * \text{moduli}\_b) < \text{scanning\_window\_size},$$

where k_a represents a first value of a set of known integer values that is associated with one of the possible true range rate values computed for a first data point, k_b represents a second value of the set of known integer values that is associated with a one of the possible true range rate values computed for a second data point, moduli_a represents a moduli value associated with the first data point in the point cloud information, moduli_b represents a moduli value associated with the second data point in the point cloud information, and scanning_window_size represents a size of the scan window.

9. The method according to claim 7, wherein the possible true range-rate values are computed when a determination is made that at least two of the data points in the at least one segment have moduli values that are different by a certain amount.

10. The method according to claim 7, further comprising setting a flag to a value that indicates the at least one segment comprises unreliable range-rates, when a determination is made that at least two modulus of the data points in the at least one segment do not have moduli values that are different by the certain amount.

11. The method according to claim 1, further comprising removing at least one outlier data point from the at least one segment.

12. The method according to claim 11, wherein the at least one outlier data point comprises a data point having a possible true range-rate value falling outside of the identified scan window.

13. The method according to claim 1, further comprising setting a flag to a value that indicates the at least one segment comprises unreliable range-rates, when a determination is made that at least two of the data points associated with the possible true range-rate values included in the identified scan window have moduli values that are not different by the certain amount.

14. The method according to claim 1, further comprising using the modified point cloud information to generate at least one possible trajectory for an object located in proximity to the radar system.

15. The method according to claim 14, further comprising using the at least one possible trajectory for the object to determine a vehicle trajectory.

16. The method according to claim 15, further comprising causing a vehicle to follow the vehicle trajectory.

17. A system, comprising:
a processor; and
a non-transitory computer-readable storage medium comprising programming instructions that are configured to cause the processor to implement a method for operating a radar system, wherein the programming instructions comprise instructions to:

receive point cloud information generated by radar devices;

group data points of the point cloud information to form at least one segment;

compute possible true range-rate values for each data point in the at least one segment, each said possible true range-rate value being a function of at least a moduli value contained in the point cloud information and a range-rate value contained in the point cloud information;

identify a scan window including possible true range-rate values for a largest number of data points;

determine whether at least two modulus of the data points associated with the possible true range-rate values included in the identified scan window have moduli values that are different by a certain amount;

determine a new range-rate value for each at least one data point of the at least one segment, when a determination is made that at least two modulus of the data points associated with the possible true range-rate values included in the identified scan window do have moduli values that are different by the certain amount; and modify the point cloud information in accordance with the new range-rate value.

18. A system, comprising:

radar devices configured to generate point cloud information;

a processor communicatively coupled to the radar devices; and a non-transitory computer-readable storage medium comprising programming instructions that are configured to cause the processor to implement a method for operating a radar system, wherein the programming instructions comprise instructions to:

receive point cloud information generated by the radar devices;

group data points of the point cloud information to form at least one segment;

compute possible true range-rate values for each data point in the at least one segment, each said possible true range-rate value being a function of at least a moduli value contained in the point cloud information and a range-rate value contained in the point cloud information;

identify a scan window including possible true range-rate values for a largest number of data points;

determine whether at least two modulus of the data points associated with the possible true range-rate values included in the identified scan window have moduli values that are different;

determine a new range-rate value for each at least one data point of the at least one segment, when a determination is made that at least two modulus of the data points associated with the possible true range-rate values included in the identified scan window do have moduli values that are different by the certain amount; and modify the point cloud information in accordance with the new range-rate value.

19. The system according to claim 18, wherein the point cloud information comprises first point cloud information generated by the radar devices during a first cycle and second point cloud information generated by the radar devices during a second cycle.

20. The system according to claim 19, wherein the programming instructions further comprise instructions to combine the first and second point cloud information to form consolidated point cloud information for a plurality of data points.

21. The system according to claim 20, wherein the data points of the consolidated point cloud information are grouped to form the at least one segment.

22. The system according to claim 21, wherein the consolidated point cloud information is modified to include the new range-rate value.

23. The system according to claim 18, wherein a determination is made that at least two modulus of the data points associated with the possible true range-rate values included in the identified scan window have moduli values that are different by the certain amount when that at least two modulus satisfy mathematical equation $$\min\_\{k\_a, k\_b\} \text{abs}(\text{moduli}\_a * k\_a - k\_b * \text{moduli}\_b) < \text{scanning\_window\_size},$$

where k_a represents a first value of a set of known integer values that is associated with one of the possible true range rate values computed for a first data point, k_b represents a second value of the set of known integer values that is associated with a one of the possible true range rate values computed for a second data point, moduli_a represents a moduli value associated with the first data point in the point cloud information, moduli_b represents a moduli value associated with the second data point in the point cloud information, and scanning_window_size represents a size of the scan window.

24. The system according to claim 18, wherein the programming instructions further comprise instructions to determine whether at least two modulus of the data points in the at least one segment have moduli values that are different by a certain amount.

25. The system according to claim 24, wherein the possible true range-rate values are computed when a determination is made that at least two modulus of the data points in the at least one segment do have moduli values that are different by the certain amount.

26. The system according to claim 24, wherein the programming instructions further comprise instructions to set a flag to a value that indicates the at least one segment comprises unreliable range-rates, when a determination is made that at least two modulus of the data points in the at least one segment do not have moduli values that are different by the certain amount.

27. The system according to claim 18, wherein the programming instructions further comprise instructions to remove at least one outlier data point from the at least one segment.

28. The system according to claim 27, wherein the at least one outlier data point comprises a data point having a possible true range-rate value falling outside of the identified scan window.

29. The system according to claim 18, wherein the programming instructions further comprise instructions to set a flag to a value that indicates the at least one segment comprises unreliable range-rates, when a determination is made that at least two modulus of the data points associated with the possible true range-rate values included in the identified scan window do have moduli values that are not different by the certain amount.

30. The system according to claim 18, wherein the programming instructions further comprise instructions to use the modified point cloud information to generate at least one possible trajectory for an object located in proximity to the radar system.

31. The system according to claim 30, wherein the programming instructions further comprise instructions to use the at least one possible trajectory for the object to determine a vehicle trajectory.

32. The system according to claim 31, wherein the programming instructions further comprise instructions to cause a vehicle to follow the vehicle trajectory.

* * * * *